US005659732A

United States Patent [19]
Kirsch

[11] Patent Number: 5,659,732
[45] Date of Patent: Aug. 19, 1997

[54] DOCUMENT RETRIEVAL OVER NETWORKS WHEREIN RANKING AND RELEVANCE SCORES ARE COMPUTED AT THE CLIENT FOR MULTIPLE DATABASE DOCUMENTS

[75] Inventor: Steven T. Kirsch, Los Altos, Calif.

[73] Assignee: Infoseek Corporation, Santa Clara, Calif.

[21] Appl. No.: 443,348

[22] Filed: May 17, 1995

[51] Int. Cl.$^6$ .................................................. G06F 17/30
[52] U.S. Cl. ....................... 395/605; 395/610; 395/604; 395/609
[58] Field of Search .................. 364/419.9; 395/600, 395/609, 610, 605, 604

[56] References Cited

U.S. PATENT DOCUMENTS

| | | | |
|---|---|---|---|
| 4,805,134 | 2/1989 | Calo et al. | 395/610 |
| 5,107,419 | 4/1992 | MacPhail | 395/609 |
| 5,333,312 | 7/1994 | Wang | 395/610 |
| 5,544,352 | 8/1996 | Egger | 395/605 |

FOREIGN PATENT DOCUMENTS

0304191-A2  2/1989  European Pat. Off. .

OTHER PUBLICATIONS

Computer Record Access No. 01929334 of Seybold Report on Desktop Publishing, v10, n8, p. 17(6), Apr. 22, 1996, "Searching far and wide: the powerful document retrieval software of PLS", Banet B.

O'Leary, Mike "Dialog Targets New Age Searching", Information Today, v10, n11, pp. 49–50 Dec. 1993.

"DR–LINK Quick Start Guide", Manning & Napier InformationServices, pp. 1–26, Mar. 96 Mar. 1996.

Al–Hawamdeh et al. "Compound Document Processing System", Proceeding of the Fifteeth Annual International Computer Software and Applications Conference, pp. 640–644 Sep. 11, 1991.

Salton et al. "The SMART Automatic Document Retrieval System—An Illustration", Communications of the ACM, v8, n6 Jul. 1996.

Obraczka et al. "Internet Resource Discovery Services", IEEE Computer, pp. 8–22 1993.

Bowman et al. "Harvest: A Scalable, Customizable Discovery andAccess System", Dept. of Computer Science, Univ. of Colorado–Boulder, pp. 1–27 Aug. 26, 1994.

Salton et al. "A Vector Space Model for Automatic Indexing", Communications of the ACM, v. 18, n. 11 Nov. 1975.

Turtle et al. "A Comparison of Text Retrieval Mdoels", The Computer Journal, v. 35, n. 3, pp. 279–290 Jun. 1992.

J. P. Callan et al., "TREC and TIPSTER Experiments with INQUERY", Information Processing and Management, Jun. 1994.

James P. Callan et al., "The INQUERY Retrieval System", Proceedings of the Third International Conference on Database and Expert Systems Applications, Valencia, Spain, pp. 78–83, 1992.

(List continued on next page.)

Primary Examiner—Thomas G. Black
Assistant Examiner—Charles L. Rones
Attorney, Agent, or Firm—Thomas Schneck

[57] ABSTRACT

A document search method using a plurality of databases available from one or more servers using one or more search engines. For each database, the number of records is determined and reported, as well as frequency of search query term occurances or hits, together with identification of database records corresponding to the hits. Reports from a plurality of databases are furnished to a user terminal, a client, where client software computes a relevance score for each record based upon the number of records in the database, the number of records having at least one hit and the number of hits for each record. This local computation from uniform data allows all documents to be ranked consistently as if coming from a single database.

11 Claims, 1 Drawing Sheet

OTHER PUBLICATIONS

P. B. Danzig et al., "Distributed Indexing: A Scalable Mechanism for Distributed Information Retrieval", *Proceedings of the Fourteenth Annual International ACM/SIGIR Conference on Research and Development in Information Retrieval*, Chicago, IL, pp. 220–229, Oct. 1991.

S. T. Dumais, "Latent Semantic Indexing (LSI): TREC–3 Report", *The Second Text REtrieval Conference (TREC–2)*, Gaithersburg, MD, National Inst. of Standards and Technology Special Publn. 500–215, pp. 219–230, No date.

Luis Gravano et al., "The Effectiveness of GlOSS for the Text Database Discovery Problem", *Proceedings of the 1994 ACM SIGMOD*, Minneapolis, MN, May 24–27, 1994, GMOD Record, vol. 23, No. 2, pp. 126–137, Jun. 1994.

K. L. Kwok et al., "TREC–3 Ad–Hoc, Routing Retrieval and Thresholding Experiments using PIRCS", *The Third Text REtrieval Conference (TREC–3)*, Gaithersburg, MD, National Inst. of Standards and Technology Special Publn. 500–225, pp. 247–255, no date.

R. S. Marcus, "An Experimental Comparison of the Effectiveness of Computers and Humans as Search Intermediaries", *Journal of the American Society for Information Science*, 34(6), pp. 381–404, 1983.

A. Moffat et al., "Information Retrieval Systems for Large Document Collections", *The Third Text REtrieval Conference (TREC–3)*, Gaithersburg, MD, National Inst. of Standards and Technology Special Publn. 500–225, pp. 85–93, No date.

Edie Rasmussen, "Clustering Algorithms", *Information Retrieval: Data Structures and Algorithms*, chapter 16, pp. 419–442, 1992.

S. E. Robertson et al., "Okapi at TREC–3", *The Third Text REtrieval Conference (TREC–3)*, Gaithersburg, MD, National Inst. of Standards and Technology Special Publn. 500–225, pp. 109–126, No date.

Howard Turtle et al., "Evaluation of an Inference Network–Based Retrieval Model", *ACM Transactions on Information Systems*, vol. 9, No. 3, pp. 187–222, Jul. 1991.

Howard R. Turtle et al., "Efficient Probabilistic Inference for Text Retrieval," *RIAO 91 Conference Proceedings*, Barcelona, Spain, pp. 644–661, Apr. 1991.

E. M. Vorhees et al., "The Collection Fusion Problems", *The Third Text REtrieval Conference (TREC–3)*, Gaithersburg, MD, National Inst. of Standards and Technology Special Publn. 500–225, pp. 95–104, No date.

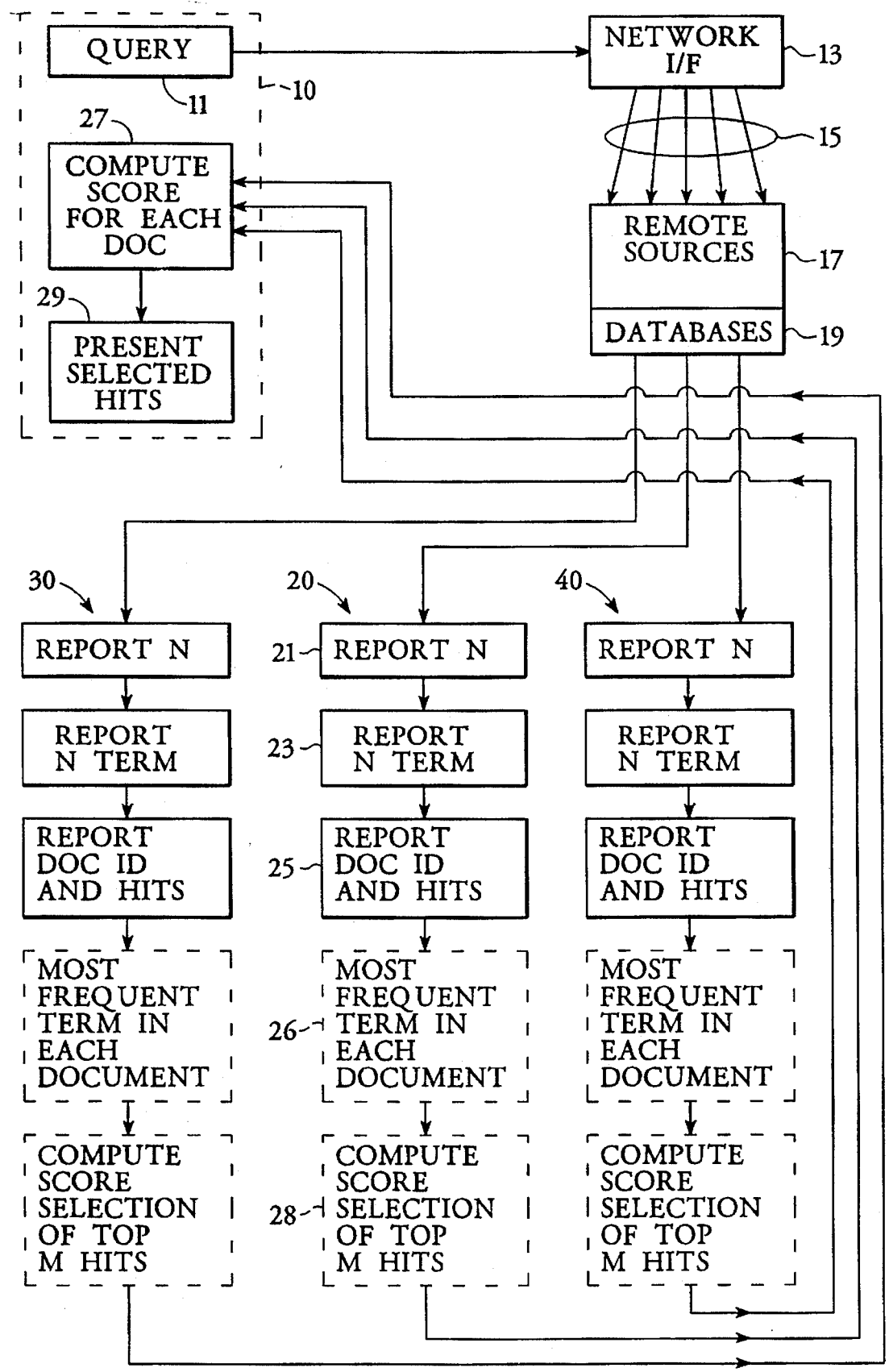

DOCUMENT RETRIEVAL OVER NETWORKS WHEREIN RANKING AND RELEVANCE SCORES ARE COMPUTED AT THE CLIENT FOR MULTIPLE DATABASE DOCUMENTS

TECHNICAL FIELD

The invention relates to document searching and retrieval, particularly over networks.

BACKGROUND ART

For more than twenty years, information services have provided access to multiple databases. For example, Dialog Information Services, now known as Knight-Ridder Information, Inc., provides several hundred databases (a.k.a collections) available to searchers. Some of these databases contain bibliographic abstracts, while others contain full-text documents. A searcher is able to apply a query to one or to a plurality of databases. At the outset, the searcher selects individual databases which are of interest, based on past experience, or selects a group of databases, selected by the information provider and related to a particular topic. For example, a searcher might select the topic of patents, a topic for which the information service has grouped a number of databases specific to patents. When a query is applied to the group of databases, the information service retrieves the number of hits in each database. The searcher then accesses databases of interest to view individual records. This system was originally designed for librarians and professional researchers who know where to look for desired information.

As wide area networks, such as Internet, become available, new opportunities in searching have become available, not only to searching professionals, but to lay users. New types of information providers are arising who use public, as well as private, databases to provide bibliographic research data and documents to users. When a user has an interest in a topic, such as patents, he may not know what resources can be assembled for a search, nor the location of the resources. Since the resources frequently change, a searcher will have less interest in the source of the reply compared to the relevance of the reply. It has been recognized by others that distributed collections, available over wide area networks, can be treated as a single collection. Each sub-collection is searched individually, and the reports are combined in a single list. It has also been recognized by others that documents can be ranked by search engines in accord with an algorithm and given a weight, taking into account the nature of a particular collection. Document scores can be normalized to obtain scores that would be obtained if individual document collections were merged into a single, unified collection.

One of the problems that exists in the prior art is that the scores for each document are not absolute, but dependent on the statistics of each collection and on the algorithms associated with the search engines. A second problem which exists is that the standard prior art procedure requires two passes. In a first pass, statistics are collected from each search engine in order to compute the weight for each query term. In a second step, the information from the first step is passed back to each search engine, which then assigns a particular weight or score to each hit or identified document. A third problem that exists is that the prior art requires that all collections use the same search engine.

An object of the invention was to devise a method for searching multiple collections on a single pass, with ranking of documents on a consistent basis so that if the same document appears in two different databases, it would be scored the same when the results are merged. It is not required that the same search engine be used for all collections.

SUMMARY OF THE INVENTION

The above object has been achieved with a document search and retrieval method which requires each participating search engine server to return statistics about each query term in each of the documents returned. A final relevance score is then computed at the client end, not the server. In this manner, all relevance scores are processed at the client in the same manner regardless of differences in the search engines.

BRIEF DESCRIPTION OF THE DRAWING

FIG. 1 is a block diagram of the system of the present invention.

BEST MODE FOR CARRYING OUT THE INVENTION

With reference to FIG. 1, a query, indicated by the query block 11, is formulated by a user and applied to a terminal or client system. The query is electronically transmitted to a network interface 13. The network interface is an information service which has access to sources 17 having databases relating to the subject of the query. These databases, mounted on other servers, are simultaneously polled over communications channels 15, which may be wide area network links to the sources 17. The Internet is a model for such an arrangement of wide area network links and remote sources. The query is applied to search engines, represented by columns 20, 30, and 40, with each search engine accessing an associated database in block 19. Each search engine may have its own operating characteristics, such as Boolean logic, statistical inferences, etc. Each database produces a report containing the number of records, N, in the database, indicated by block 21. Also contained in the report is the number of times each search term occurs in documents responsive to the query. This quantity, $N_{TERM}$, is indicated by block 23. Thirdly, the report produces a document identification number for each document containing hits, together with the number of occurrences of each search term, as indicated by block 25. From this information, a computation is made by the client software, using its own algorithm, of a score for each document, indicated by block 27. For example, a formula for computing a score is as follows:

$$doc\ score = \sum_{all\ terms} t_f \cdot idf$$

where $t_f$=number of occurrences of the term in the document and $$idf = \log\left(\frac{N}{N_{TERM}}\right)$$

where N and $N_{TERM}$ are the sum of N and $N_{TERM}$ values reported by all collections. The computed scores are transmitted to an output buffer, indicated by block 29, which sifts the top M scores from computation block 27, which have been requested by the person making the query. Note that only a single pass has been made through the database. Computed scores are treated as absolute values.

In an alternate embodiment, an optional parameter may be reported for use in the algorithm. Block 26 shows that the frequency of the most frequent term in each document is reported for purposes of using a more sophisticated ranking formula of the client. Another optional data reduction step is that each search engine may compute a score for document relevance in the manner known in the prior art. From this data, the search engine may preselect up to the top M hits in the database, where M is a maximum number of hits required by the user.

As an example, a search query might involve documents with the words "graphical user-interface". Table 1 below shows a report generated by a search engine which has selected a number of the highest ranking documents. This report is returned to the user's client software, where the user applies an algorithm, such as in formula (1) above, using term frequency data and document frequency data returned by each search engine. Thus, there is a local calculation of the document weighting for each query term, combining the $N_{TERM}$ and N (=number of documents) returned from each collection. Hence, term weighting is exactly the same as if the collections had been a single collection. Scoring is totally consistent even if different search engines participated in the search and the same document appearing in 2 different collections will always receive an identical score.

TABLE 1

| N is 65,000 ← total number of documents in the collection | | | | |
|---|---|---|---|---|
| DocID | graphical | user-interface | | |
| 123 | 3 | 1 | ← | occurrences within the document of the term |
| 189 | 5 | 4 | | |
| 100 | 4 | 2 | | |
| . | . | . | | |
| . | . | . | | |
| . | . | . | | |
| 232 | 32 | 2 | | |
| $N_{TERM}$ | 10000 | 23000 | ← | number of documents which contain the search term at least once |

I claim:

1. A method for searching a plurality of databases which are distributed and accessible to a client through one or more search servers comprising,
   (a) applying a search query from the client to each server associated with each database,
   (b) determining at each server a list of relevant documents,
   (c) obtaining, at the client from each server, statistics about each database,
   (d) obtaining, at the client from each server, information about the relevant documents resulting from application of the query to the associated database, and
   (e) computing, at the client, a relevance score for each document using said statistics and said information whereby the computed relevance score is used in determining how the relevant documents from all of the databases should be ordered in a list of merged relevant documents.

2. The method of claim 1 wherein the statistics about said collection include the size of the collection in terms of the number of records.

3. The method of claim 1 wherein the information about each document includes the number of times each search term appeared in the document.

4. The method of claim 1 wherein the information about each database includes the number of documents containing each search term.

5. A method for searching a plurality of databases which are distributed and accessible to a client through one or more servers comprising,
   (a) accessing each database from the client,
   (b) applying a search query from the client to the server associated with each database,
   (c) obtaining, at the client, statistics about each database,
   (d) obtaining, at the client, statistical information about the relevant documents resulting from application of the query to the database, including term count information for each document, and
   (e) computing, at the client, a global score for the relevant documents in a list of merged relevant documents from all of the databases using said statistics and said information whereby the computed relevance score is used in determining how the relevant documents from all of the databases should be ordered in a list of merged relevant documents.

6. A method for searching text documents among a plurality of databases accessible through a server, in response to a search query at a client,
   (a) applying a search query at the client to each database accessed through a server,
   (b) for each database determining the total number of documents,
   (c) for each of said databases, determining at the server the number of hits of each search query term for each relevant database document,
   (d) for each of said databases, and for each query term, counting the documents having at least one hit, and
   (e) computing at the client a relevance score of each record with respect to the search query, using the results of steps (b), (c) and (d) whereby the computed relevance score is used in determining how the relevant documents from all of the databases should be ordered in a list of merged relevant documents.

7. The method of claim 6 further defined by selecting a number of databases, having more than one search engine for the databases, prior to applying the same search query to all databases.

8. The method of claim 7 by selecting a number of records to be reviewed from among said number of databases, said number having the highest relevance scores for the search query.

9. The method of claim 8 further defined by preselecting a number of records prior to computing a relevance score.

10. A method for searching a plurality of databases which are distributed and accessible to a client through one or more search servers comprising,
   providing a plurality of search engines each associated with a server storing a database,
   applying a search query from the client to each search engine associated with a server storing a database, the search engines determining at each server a list of relevant documents,
   obtaining, at the client from each server, statistical information about the relevant documents resulting from application of the query to the associated database, and
   computing, at the client, on a single pass, a relevance score for each document using said statistical information about the relevant documents whereby the computed relevance score is used in determining how the relevant documents from all of the databases should be ordered in a list of merged relevant documents.

11. A method for searching a plurality of diverse databases which are distributed over a network and accessible to a client through one or more search servers using a plurality of search engines each associated with a server storing a database comprising, obtaining, at the client from each search server, statistical information about relevant documents resulting from application of a query to a database associated with a search engine, and computing, at the client, on a single pass, a relevance score for each document using said statistical information whereby the computed relevance score is used in determining how the relevant documents from diverse databases should be ordered in a list of merged relevant documents.

* * * * *